United States Patent Office 2,745,567
Patented May 15, 1956

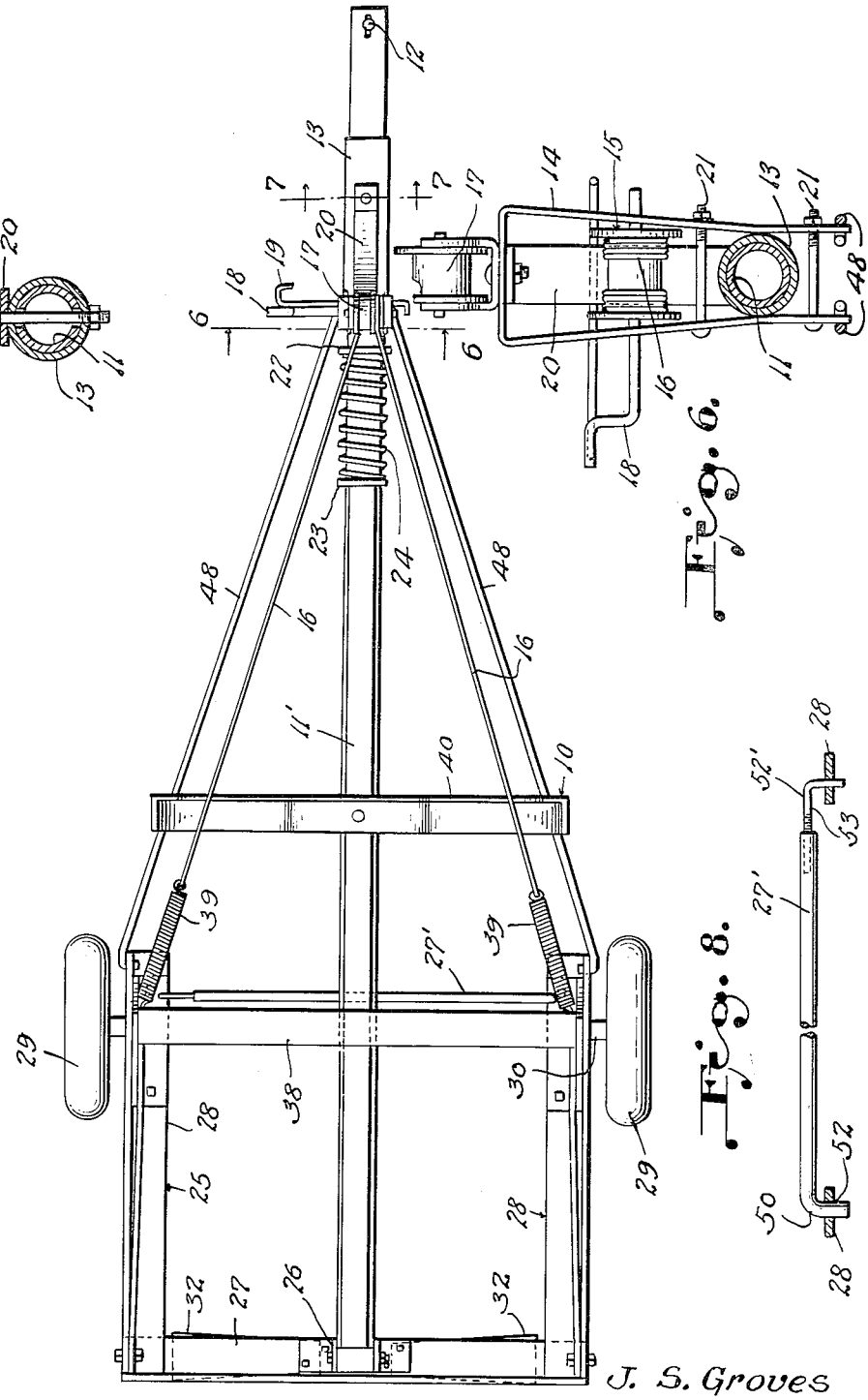

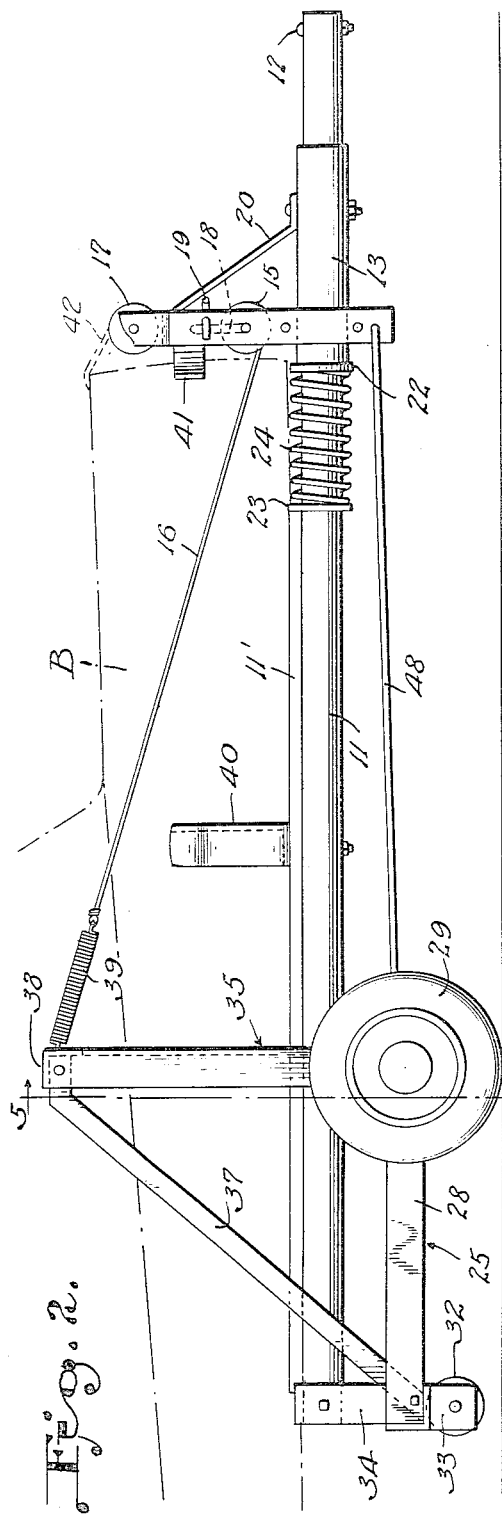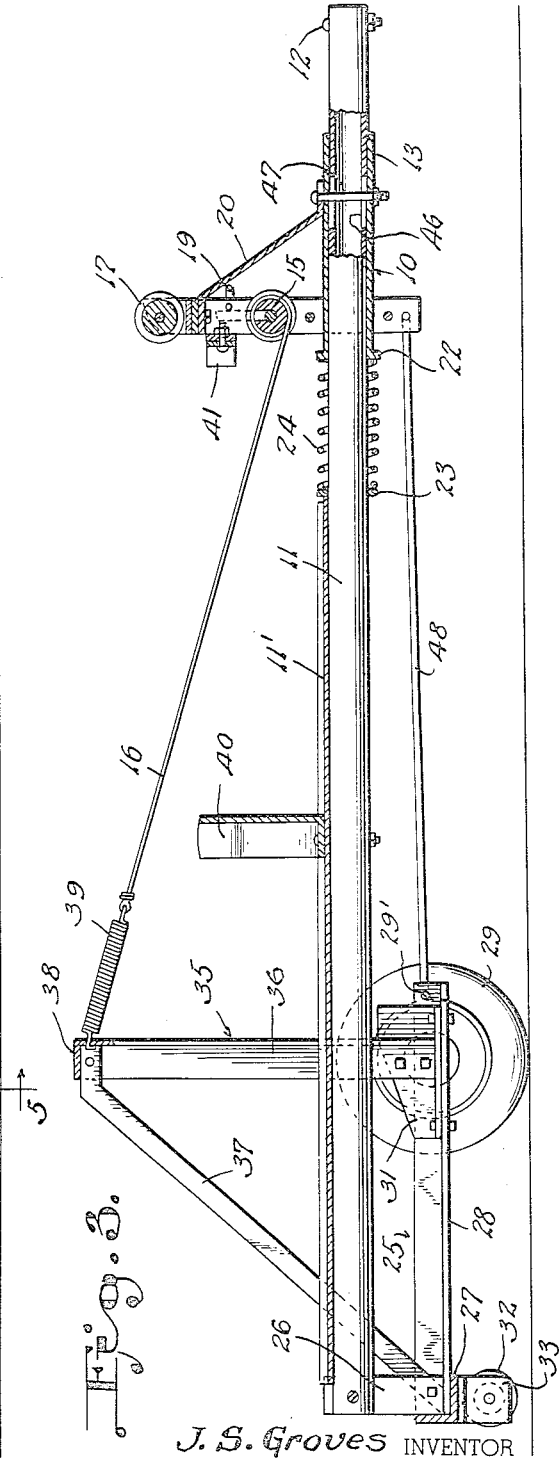

2,745,567

BOAT TRAILER

Jim S. Groves, Lewisville, Tex.

Application October 30, 1953, Serial No. 389,251

1 Claim. (Cl. 214—506)

This invention relates to a boat trailer for transporting a boat over roads or the like when the boat has been removed from a body of water.

It is a principal object of this invention to provide a boat trailer of the kind to be more particularly described hereinafter having a winch and flexible connection between the boat trailer and boat for hoisting the boat from the water and onto the trailer with a second winch on the trailer for lifting one end of the trailer from engagement with the ground after the boat is aboard.

It is another object of this invention to provide a boat trailer of this kind having a supporting tube for carrying a boat and a drawbar on one end of the tube with a spring shock absorber between the tube and drawbar for cushioning the trailer as it is being drawn by a tractor.

It is another object of this invention to provide a boat trailer of this kind having a supporting tube with a cradle in which the hull of a boat to be transported is seated and having a base frame on one end of the supporting tube which is engageable with a fixed supporting surface while the boat is being hoisted aboard the trailer and which is movable away from the ground for transportation of the boat.

It is a further object of this invention to provide a boat trailer of this kind by which a boat, of any size and weight, may be readily moved properly onto the trailer with a minimum amount of effort and in a short length of time by one person.

Other and further objects and advantages of the invention will be hereinafter described and the novel features thereof defined in the appended claim.

In the drawings:

Fig. 1 is a top plan view of a boat trailer constructed according to an embodiment of my invention.

Fig. 2 is a side elevation.

Fig. 3 is a longitudinal section.

Fig. 6 is an enlarged fragmentary transverse section taken on the line 6—6 of Fig. 1.

Fig. 7 is an enlarged detailed transverse section taken on the line 7—7 of Fig. 1.

Fig. 8 is an enlarged plan view, partly broken away and partly in section, of the tie rod between the wheels.

Figure 4:
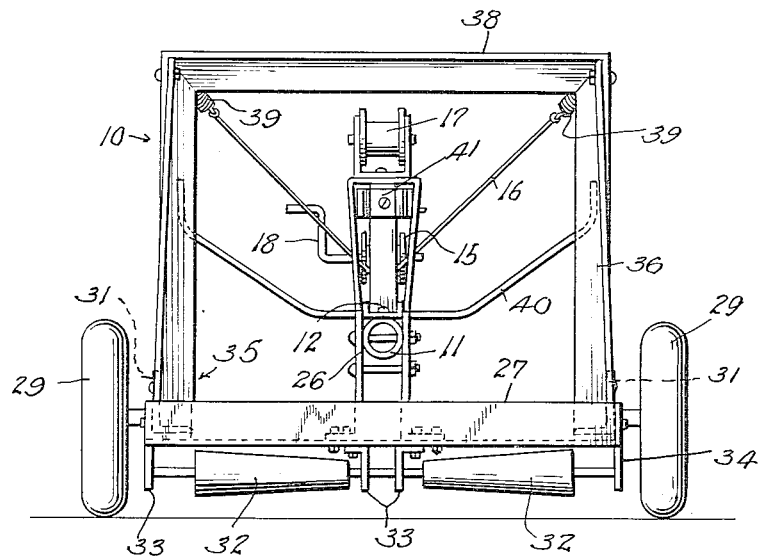
Fig. 4 is an end elevation.
Figure 5:
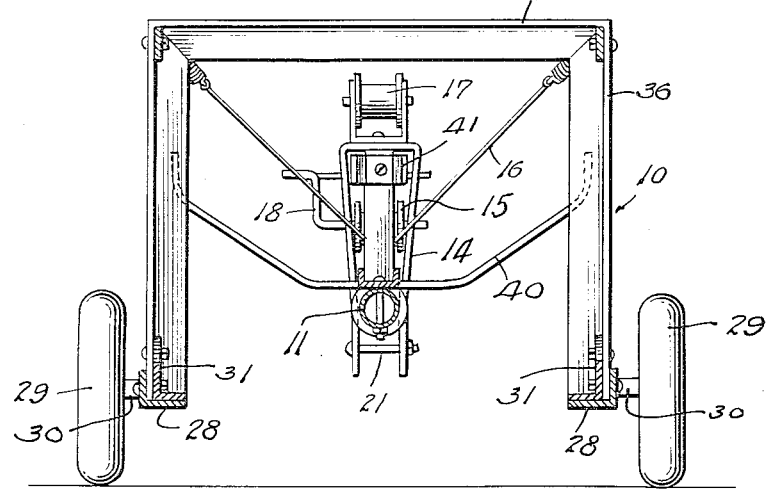
Fig. 5 is a transverse section taken on the line 5—5 of Fig. 2.

Referring more specifically to the drawings, the numeral 10 designates generally a boat trailer constructed according to an embodiment of this invention for transporting a boat over a road or the like after the boat has been removed from the water.

The boat trailer 10 is formed with a longitudinally extending tube 11 having a flat arm 11' secured to the upper side thereof and one end of the tube 11 is extended for connection to a trailer in the manner of a drawbar. A pin 12 is extended transversely through the tube 11 for connecting this end of the tube to the drawbar of the tractor, not shown in the drawings.

The tube 11 is provided with a longitudinally extending sleeve 13 slidable thereon adjacent to the pin connection of the drawbar to the tractor.

A pair of upwardly extending bracket arms 14 are secured to the sleeve 13, intermediate the length thereof for the purposes to be more particularly described hereinafter.

The bracket arms 14 are extended vertically upwardly from the sleeve 13 and rotatably support therebetween a pulley 15 about which a cord, or wire, may be wound in the manner of a winch.

A crank 18 for the pulley 15 is extended outwardly from the pulley on the outer side of the bracket arms 14 and a lock 19 is loosely carried by the bracket arms 14 for locking engagement with the crank 18 to secure the crank and pulley against further rotation on the boat trailer. A brace 20 is secured to the end of the sleeve 13 and to the upper end of the bracket arms 14 to positively locate the bracket arms together with the winch on the sleeve 13.

The two bracket arms 14 are extended upwardly above the tube 11 and downwardly therebelow and the two bracket arms 14 are secured together in the manner of a clamp by longitudinally extending bolts 21 which extend through both of the bracket arms 14 for clampingly securing the bracket arms on the sleeve 13 in its preferred most forward location as clearly shown in the drawings.

A collar 22 is formed on one end of the sleeve 13 adjacent to the tube 11 and another collar 23 is formed on the end of the tube 11 adjacent ot the sleeve. A coiled spring 24 is coiled about the tube 11 adjacent to the sleeve 13 with one end of the coiled spring 24 engaging against the collar on the sleeve and the other end of the spring engaging against the collar on the tube for constantly urging the sleeve longitudinally forwardly of the tube 11.

A base frame 25 is fixed to one end of the tube 11 remote from the bracket arms 14 and the base frame 25 is secured to the end of the tube 11 by a clamp 26 which is fixed to the transverse base frame arm 27 of the base frame 25 and clampingly engaged about the tube 11 at the end thereof remote from the bracket arms 14 and sleeve 13.

A longitudinally extending base frame arm 28 is fixed at one end to one end of the transverse base frame arm 27 and extends in spaced relation to and parallel to the tube 11. There is a longitudinal frame arm 28 on each side of the tube 11 connected to each end of the transverse base frame arm 27.

A wheel 29 is rotatably supported on each side of the base frame 25 having an axle 30 at the center and axis thereof which is carried by an axle plate 31 which in turn is carried by each end of the longitudinally extending base frame arms 28 so that the axles 30 are more or less fixed in relation to the base frame 25 and the wheels 29 are rotatable on the axles 30.

A pair of rollers 32 are rotatably secured to the rear end of the base frame 25 and are supported below the horizontal plane of the base frame 25 by a depending bracket 33 which is fixed to the rear end of the longitudinally extending base frame arms 28. The brackets 33 near the center of the boat trailer constitute the support for the center portion of each of the rollers 32 and a depending arm 34 extending downwardly from the base frame rotatably supports the outer end of each of the shafts of the rollers 32. The rollers 32 are preferably made of resilient material, such as rubber, so that when the boat trailer 10 is pivoted about the axles 30 of the wheels 29, the rear end of the boat trailer will be supported on the ground until the boat is firmly secured on the boat trailer.

A boat frame 35 is positioned above the base frame 25 and above the axles of the wheels, the boat frame 35 being formed with vertically extending arms 36 on the opposite sides of a base frame 25 and adjacent to the forward ends thereof.

Each of the vertical arms 36 is braced in its proper position on the boat trailer 10 and secured thereon by upwardly and inwardly extending braces 37 which are fixed at their lower ends to the rear end of the base frame longitudinal frame arms 28 and extend upwardly and inwardly from the base frame in the direction of the boat frame. The end of the braces 37 connected to the boat frame 35 is secured to the horizontally extending boat frame 38 which also connects together the vertically extending boat frame arms 36.

As the boat frame 35 and the base frame 25 are pivotally mounted on the axle of the wheels 29, the boat frame and base frame may be rocked or tilted about the axis of the axles of the wheels by the increase in tension on the cord 16 which is engaged at one end to the connection of the horizontal boat frame arm 38 with the vertical arm of the boat frame and at the other end to the pulley 15. At the connection of the cord 16 with the upper end of the vertically extending boat frame arms 36, an elongated coil spring 39 is connected directly to the adjacent end of the cord 16 and to the horizontally extending boat frame arm 38 as clearly noted in the drawings. Whereas rotation of the winch having the pulley 15 is adapted to pivot the boat and base frame upwardly to be supported by the wheels 29 out of engagement with the ground the spring 39 will provide a certain amount of leeway and play for properly positioning the boat on the trailer in the boat cradle 40.

The boat cradle 40 is somewhat U-shaped in configuration and secured to the tube 11 and flat arm 11', intermediate the length thereof so that the boat, not shown in the drawings, may be drawn upwardly into the boat trailer to rest on the cradle 40 with the prow of the boat in engagement with the boat stop 41 which is secured on the upper end of the bracket arms 14. The boat B is initially slid onto the boat trailer 10 by a rope 42 which is trained about the upper pulley 17 on the bracket arm 14 and connected at one end to the bow of the boat so that upon rotation of the upper winch the boat B is drawn upwardly onto the boat trailer 10 until the bow of the boat is nested into the U-shaped stop 41.

The cradle 40 engages about the hull of the boat B and the stop 41 engages about the prow of the boat to position and steady the boat on the boat trailer while the boat is being transported thereon.

In the use and operation of the boat trailer 10, the rope 42 is stretched from the prow of the boat onto the upper winch 17 for drawing the boat B out of the water, or from any other supporting surface for the boat, onto the boat trailer 10. The base frame 25 is lowered by the lower winch and pulley 15 when the weight of the boat B is initially lowered onto the boat trailer 10.

The boat, when loaded onto the boat trailer 10, may be transported by the tractor, not shown in the drawings, which exerts a tensional force along the length of the tube 11 and at this time, the tube 11 and sleeve 13 are moved together in the direction of the movement of the tractor. When the tractor is slowed and the trailer 10 is moved forwardly by the weight of the boat thereon, the tube 11 is caused to move slower than the sleeve 13 and the difference in movement between the sleeve 13 and the tube 11 is cushioned by the shock absorber effect of the spring 24 between the tube 11 and the sleeve 13.

A tie rod 48 is pivotally connected at one end to the lower end of the bracket arms 14 and pivotally connected at the other end thereof to the base frame 25. The rear end of the tie rods 48 is pivotally connected to the forward end of the longitudinally extending frame arm 28, on both sides of the base frame 25 with the other end of the tie rods 48 converging in the direction of the forward end of the tie rods 48 and the bracket arms 14.

In order to secure the forward ends of the longitudinally extending base frame arms 28 together a transversely adjustable link 27' is detachably secured on the forward ends of the longitudinally extending base frame 25. The link 27' is an elongated bar having a hook 50 at one end engageable in a hole 52 in one end of one of the base frame arms 28 and another hook 52' adjustably engaged with the other end of the bar. The hook 52' has a threaded shank 53 threadable with one end of the link 27' and a hooked end engageable in a hole 52 in the opposite longitudinal base frame arm 28.

In the use and operation of the boat trailer 10 the same is secured to a tractor by a connecting pin 12 and the entire trailer and boat supported thereon can be moved by and with the tractor. The boat trailer wheels together with the boat supporting cradle 40 and longitudinally extending tube 11 are slidable longitudinally of the trailer and rotatable to a degree, relative to the sleeve 13 at the forward end.

While the specific details of one embodiment of this invention have been herein shown and described, the invention is not confined thereto as changes and alterations may be made without departing from the spirit and scope thereof as defined in the appended claim.

I claim:

A boat trailer of the kind described comprising an elongated supporting tube, a horizontal base frame secured to said supporting tube adjacent the rear end thereof, an upwardly extending open boat support frame secured at the lower end thereof to the forward end of said base frame and extending upwardly of said supporting tube intermediate the length thereof, outwardly extending wheels carried by said frames at the juncture thereof, transversely extending resilient rollers carried by said base frame below the rear end thereof, a brace between the rear end of said base frame and the upper end of said boat support frame, a pair of radius rods pivotally connected at one end thereof to the forward end of the base frame and converging at the other end forwardly of said base frame, a sleeve slidable on the forward end of said supporting tube, a coiled spring between said sleeve and said forward end of said tube, a pair of upwardly extending bracket arms carried by said sleeve adjacent said other end of said tube, the other ends of said radius rods being secured to the lower end of said bracket arms below said supporting tube, a winch rotatably mounted on the upper ends of said bracket arms, a flexible tensile member engaged at one end about said winch and secured at the other end to the upper end of said boat supporting frame for rotatably supporting said boat frame on said wheels and a boat cradle secured on said supporting tube intermediate the length thereof.

References Cited in the file of this patent

UNITED STATES PATENTS

| 1,439,235 | Haase | Dec. 19, 1922 |
| 2,388,336 | Miller | Nov. 6, 1945 |
| 2,405,299 | Godwin | Aug. 6, 1946 |
| 2,485,793 | Vassar | Oct. 25, 1949 |
| 2,558,418 | Brueckman | June 26, 1951 |
| 2,650,730 | Rohm | Sept. 1, 1953 |
| 2,660,443 | Miller | Nov. 24, 1953 |